United States Patent Office 3,164,560
Patented Jan. 5, 1965

3,164,560
GELATIN-POLYETHER COMPOSITIONS
John F. Suter, Charleston, W. Va., assignor to Union
Carbide Corporation, a corporation of New York
No Drawing. Filed Dec. 2, 1960, Ser. No. 73,217
8 Claims. (Cl. 260—6)

This invention relates to compositions comprising blends of gelatin and polyether resins. In a particular aspect, this invention relates to gelatin-poly(alkylene oxide) resins which form continuous films having improved extensibility and flexibility as compared to gelatin films, and which have improved tensile strength and toughness as compared to poly(alkylene oxide) resin films.

Gelatin is a protein material produced by hydrolysis of collagen from animal bones and connective tissues. Gelatin has served as an encapsulating material, a coating for pills, an emulsifying agent, a coating for photographic materials, a bacterial culture medium, a component of printers' rollers and hectograph plates, a major ingredient of popular desserts, and for many other widely varied uses.

Although gelatin is quite strong and tough, its extensibility and flexibility are very low. It is essentially insoluble in water at ordinary temperatures and requires elevated temperatures to effect complete solution in water. Poly(alkylene oxide) resins, on the other hand, dissolve readily in water at ordinary temperatures and requires elevated temperatures to effect complete solution in water. Poly(alkylene oxide) resins, on the other hand, dissolve readily in water at ordinary temperatures, and they form films which are flexible and extensible and which usually are not high in tensile strength.

The blending of gelatin and poly(alkylene oxide) resins for the purpose of producing compositions which exhibit improved properties as compared to the individual gelatin and poly(alkylene oxide) resin components, results in compositions which are incompatible and which form films which are opaque and weak.

Accordingly, it is a main object of the present invention to provide gelatin-poly(alkylene oxide) resin blends which are compatible and can be formed into continuous films which are extensible and flexible and have good tensile strength.

Other objects and advantages of the present invention will be apparent from the accompanying description and disclosure.

One or more objects of the present invention are accomplished by the provision of compositions which comprise aqueous solutions of gelatin and poly(alkylene oxide) resins having a molecular weight between about twenty thousand and ten million, wherein said compositions have a pH in the acid range.

It was surprising to discover that compatible blends of gelatin and poly(alkylene oxide) resins could be produced by dissolving the gelatin and poly(alkylene oxide) resin materials in water and then adding acid to the composition medium to provide a pH below 7. The compositions so produced can be readily converted into gels by cooling below room temperature.

The preparation of the invention compositions is not restricted to any particular source of gelatin material. Depending on the particular combination of properties sought in the final composition blend, gelatin material can be employed which has a Bloom value in the range between 40 and 300.

The Bloom value of a gelatin is defined as the number of grams required to force a one-half inch plummet of a Bloom gelometer 4 millimeters into a gel which has been made at 6.67 percent solids concentration in water, then chilled for seventeen hours at 10° C. (the Bloom value broadly parallels the molecular weight of the gelatin).[1]

Various gelatin materials which are commercially available include acid-conditioned or lime-conditioned collagen from frozen pork skins and lime-conditioned collagen from calf skins, beef hides, and ossein.

The poly(alkylene oxide) resins contemplated in the practice of this invention are those having a molecular weight between about twenty thousand and ten million, and preferably a molecular weight between two hundred thousand and nine million. The preferred poly(alkylene oxides) are those prepared by the polymerization of 1,2-alkylene oxide monomers containing between two and about four carbon atoms. Poly(ethylene oxide) resins having a molecular weight in the range between about two hundred thousand and ten million are eminently preferred.

In the absence of suitable molecular weight determination, the poly(alkylene oxide) resins are characterized as having a reduced viscosity in excess of 0.3 and not greater than 100 in the best solvent available for a particular poly(alkylene oxide). Molecular weight can be determined by standard methods such as ultracentrifuge, light dissymmetry or osmotic pressure. Reduced viscosity can be determined with the Ubbelohde, the Ostwald or equivalent viscometer in the temperature range between 20° C. and 30° C., using a resin concentration in solution sufficiently low to produce an approximate linear relationship between reduced viscosity and polymer concentration between infinite dilution and the concentration at which the reduced viscosity is determined. Reduced viscosity is defined by the expression:

$$I_r = \frac{T - T_0}{(T_0)(C)}$$

wherein T is the time required for a low concentrate polymer solution to pass through a standardized Ubbelhode viscometer; wherein $T_0$ is the time for the pure solvent to pass through the viscometer; and wherein C is the concentration of the solution.

The gelatin and poly(alkylene oxide) resin components of the invention compositions can be employed in quantities which can vary over a broad weight range. Generally, the gelatin and poly(alkylene oxide) components are employed in a quantity to provide between about 0.1 and 10 parts by weight of poly(alkylene oxide) resin per part of gelatin in the compositions. The preferred ratio of components is between about 0.3 and 2 parts by weight of poly(alkylene oxide) resin per part of gelatin.

The invention compositions are conveniently prepared by dissolving the gelatin and poly(alkylene oxide) resin components in water at a temperature of at about 50° C. or higher so as to provide the desired solids content and

---

[1] Adopted as a standard method for the determination of the jelly strength of glue (and gelatin) by the National Association of Glue Manufacturers, Atlantic City, New Jersey, October 10, 1923.

ratio of components. The solids content of the aqueous compositions can vary from as low as 1 weight percent to as high as 10 weight percent, and higher. A solid content between 3 weight percent and 10 weight percent is convenient and suitable for most purposes.

When the components have been blended in solution, the pH of the composition is adjusted into the acid range by the addition of a suitable acid. The adjustment of the pH of the composition blends is not limited to any particular type of acid. It has been found that organic or inorganic acids, both of the strong and weak varieties, can be successfully employed to adjust the pH of the compositions. Illustrative of suitable acids are strong mineral acids such as sulfuric acid, phosphoric acid, hydrochloric acid, and the like; organic acids such as acetic acid, paratoluenesulfonic acid, citric acid, abietic acid, fatty acids, and the like. The acid is used in a quantity sufficient to provide a composition pH below 7, and preferably a pH in the range between about 2 and 6.

Water-miscible solvents such as methanol, ethanol, isopropanol, acetone, ethylene glycol monoethyl ether, acetic acid, diethylene glycol monoethyl ether, and the like, can be included in the composition solutions without adversely affecting the properties of the compositions.

Continuous films can be cast on substrates by spraying or spreading an aqueous composition of the present invention in a conventional manner followed by air-drying at room temperature or at temperatures up to about 70° C. Films prepared from the compositions of the present invention are characterized by good strength and toughness and are extensible and flexible.

When the aqueous compositions of the present invention are evaporated so as to remove the liquid medium, the residue solids content of the compositions that is recovered is readily soluble in water at room temperature. This is in contrast to gelatin alone which requires elevated temperatures to effect solution in water. Films cast from redissolved residue solids aqueous solutions have essentially the same properties as films prepared from the original acidified primary solutions. It is not necessary to acidify the solutions of redissolved residue solids, as is required in the preparation of the primary solution compositions, in order to obtain the advantageous properties characteristic of the invention compositions.

The invention compositions are useful in such applications as micro-encapsulation material, packaging films, photographic supplies, printing rollers and hectographic plates, adhesives, textile sizes and paper coatings.

The following examples will serve to illustrate specific embodiments of the invention. The quantity of acid employed in the acidification step in all the examples was sufficient to provide the compositions with a pH in the acid range.

*Example 1*

Samples of Gelatin A [1] and Gelatin B [2] were separately dissolved in warm distilled water (50° C. to 55° C.) to form 10 percent solids solutions. An aqueous solution of poly(ethylene oxide) [3] was prepared having a 15 percent solids content. While the gelatin solutions were still warm, 8 grams of the poly(ethylene oxide) resin solution was separately blended with 12 grams of each gelatin solution, thereby producing blends having a 1:1 ratio of resin to gelatin on a dry solids weight basis. The solutions of the blends were quite hazy. Films were then cast on glass plates in 20 mil (wet) thickness, and then were set aside to air-dry.

To the remainder of the two blends, three drops of concentrated phosphoric acid were added to each. The haziness characteristics of the blends disappeared at once, and the mixtures became clear. Films of these blends were cast on glass plates in the same manner as described above, and then were set aside to air-dry.

After a sixteen hour air-drying period, the films of the blends were examined. Those which were cast from the acid-treated solutions were clear, smooth and strong, while the others were quite hazy, rough in texture, and "chessy." The results with Gelatin A were similar to those with Gelatin B.

*Example 2*

This example illustrates the preparation of invention compositions employing poly(alkylene oxide) of different molecular weight than the resin used in Example 1.

A 2 percent solids solution of poly(ethylene oxide) [1] in distilled water was prepared. A sample of Gelatin C [2] was dissolved in warm distilled water (50° C. to 55° C.) to form a 10 percent solids solution. Duplicate blends were made employing two grams of gelatin solution to 10 grams of poly(ethylene oxide) resin solution, which corresponded to a 1:1 ratio of resin to gelatin on a dry solids weight basis. One blend was left untreated, while its duplicate was treated with one drop of concentrated phosphoric acid after the solutions were blended. Films were cast in the same manner as Example 1 and were allowed to air-dry.

After an overnight air-drying period, it was found that the film from the acid treated blend was clear and strong, while the film from the blend not treated with acid was translucent and weak.

*Example 3*

This example illustrates the preparation of invention compositions employing gelatin of various Bloom values.

Ten percent solids solutions of seven different gelatin samples were prepared in distilled water at 90° C. The gelatin samples were identified as follows:

|  | Bloom value |
|---|---|
| Gelatin A—Acid-conditioned collagen from frozen pork skins | 280 |
| Gelatin B—Lime-conditioned collagen from calf skins, beef hides and ossein | 200 |
| Gelatin C—Lime-conditioned collagen | 285 |
| Gelatin D—Acid-conditioned collagen | 200 |
| Gelatin E—Acid-conditioned collagen | 100 |
| Gelatin F—Lime-conditioned collagen | 100 |
| Gelatin G—Lime-conditioned collagen | 45 |

The solution of poly(ethylene oxide) resin from Example 1 was employed for blending with each of the gelatin solutions in an amount of 12 grams of gelatin solution to 8 grams of resin solution. This corresponded to a ratio of 1:1 gelatin to resin on a dry solids weight basis. After the solutions were blended, five drops of concentrated phosphoric acid were added to each one. Films were then cast on glass plates and allowed to air-dry overnight.

All of the films were found to be strong except that containing Gelatin G, which had the lowest Bloom value of the group. The films containing Gelatins E, F and G were hazy but the other films, which contained gelatin having a Bloom value of 200 or more, were clear.

All of the films were placed in a constant temperature room at 23° C. and 50 percent relative humidity for twenty-four hours for conditioning, along with a control film of Gelatin A and one of the poly(ethylene oxide) resins. After this treatment, all films except those containing Gelatins E and G were stripped from the glass

---

[1] Acid-conditioned collagen from frozen pork skins. Bloom value, 280.
[2] Lime-conditioned collagen from calf skins, beef hides and ossein. Bloom value, 200.
[3] Reduced viscosity of 3.4 (approximate molecular weight of 300,000).

[1] Reduced viscosity of 68 (approximate molecular weight of 5,500,000).
[2] Lime-conditioned collagen. Bloom value, 285.

plates (the films containing Gelatins E and G clung too tenaciously to be removed intact). The remaining films were tested with an tensile testing instrument, with the following results:

| Gelatin in Blend | Tensile, p.s.i., at Extension Rates of— | | | | Percent Elongation | Stiffness, p.s.i. |
|---|---|---|---|---|---|---|
| | 50″/Minute | 10″/Minute | 5″/Minute | 0.2″/Minute | | |
| A | 1,910 | 5,371 | 5,237 | 3,417 | 10-15 | 165,344 |
| B | 693 | 2,230 | 6,171 | 3,707 | 10-15 | 190,381 |
| C | 1,133 | 1,889 | 5,010 | 3,622 | 10-15 | 149,563 |
| D | 1,653 | 3,369 | 3,214 | 2,004 | 10-15 | 80,151 |
| F | 1,102 | 1,039 | 7,898 | 4,917 | 10-15 | 261,105 |
| Gelatin Control | 4,472 | 4,975 | 14,642 | 12,595 | 5 | 377,857 |
| Poly(ethylene oxide) Control | 1,477 | 1,088 | 868 | 703 | 1,000 | 35,161 |

The test data indicated that the addition of gelatin had improved the tensile strength of the poly(ethylene oxide) resin film, and that the addition of the poly(ethylene oxide) resin had improved the elongation of the gelatin film.

Example 4

This example illustrates the effect of varying the proportions of gelatin and poly(alkylene oxide) resin in the invention compositions.

Gelatin A and poly(ethylene oxide)[1] resin were blended as in the previous examples to produce solutions containing ratios of 2:1 and 1:2 of gelatin to resin on a dry solids weight basis. Each blend was treated with five drops of concentrated phosphoric acid. Films were cast and then were dried overnight. The films were found to be clear, smooth and strong. They were then conditioned in the constant temperature room, as in Example 3, and submitted to Instron tensile testing. The test results are listed below, and the figures obtained for Gelatin A control and poly(ethylene oxide) resin control from Example 3 are listed for comparison.

| Gelatin/poly-(ethylene oxide) | Tensil, p.s.i., at Extension Rates of— | | | | Percent Elongation | Stiffness, p.s.i. |
|---|---|---|---|---|---|---|
| | 50″/Minute | 10″/Minute | 5″/Minute | 0.2″/Minute | | |
| 2/1 | 4,388 | 4,085 | 12,624 | 9,446 | 16 | 398,837 |
| 1/2 | 4,408 | 3,914 | 3,730 | 2,116 | 75 | 8,464 |
| Gelatin Control | 4,472 | 4,975 | 14,642 | 12,595 | 5 | 377,857 |
| Poly(ethylene oxide) Control | 1,477 | 1,088 | 868 | 703 | 1,000 | 35,161 |

Example 5

This example illustrates the preparation of invention compositions employing a variety of acids to provide a pH in the required range.

Separate Gelatin A and poly(ethylene oxide) resin[1] solutions of 15 percent solids concentration in distilled water were prepared. Thirty grams of each solution was blended to yield solutions having a 1:1 ratio of gelatin to poly(ethylene oxide) resin; and 40 grams of gelatin solution and 20 grams of poly(ethylene oxide) solution were blended to form solutions having a 2:1 ratio of gelatin to poly(ethylene oxide) resin on a dry solids weight basis. Six drops of concentrated hydrochloric acid were added to each blend. The preparations were repeated employing a 50 percent solids aqueous solution of citric acid (twenty drops of citric acid solution were needed to produce clarity in the blend solution).

Films were cast from each solution and were allowed to air-dry overnight. All the films were found to be clear, smooth and strong. They were then conditioned in the constant temperature room, as in Example 3, and then submitted to tensile tests. The tensile test data obtained are listed below. It was evident from the data that the use of acids other than phosphoric acid produced the desired results.

| Acid | Gelatin/poly-(ethylene oxide) | Tensile, p.s.i., at Extension Rates of— | | | | Percent Elongation | Stiffness, p.s.i. |
|---|---|---|---|---|---|---|---|
| | | 50″/Minute | 10″/Minute | 5″/Minute | 0.2″/Minute | | |
| HCl | 2/1 | 2,204 | 8,541 | 10,873 | 7,873 | 30 | 377,893 |
| HCl | 1/1 | 1,141 | 4,408 | 8,375 | 3,949 | 14 | 246,800 |
| Citric | 2/1 | 782 | 6,482 | 12,596 | 10,717 | 17 | 456,065 |
| Do | 1/1 | 734 | 7,325 | 9,950 | 6,871 | 17 | 286,259 |

Example 6

Gelatin A was dissolved in the same manner as Example 1 to form a 10 percent solids aqueous solution. Aqueous solutions of four different molecular weight poly(ethylene oxide) resins were prepared:

Solids solution, percent

Poly(ethylene oxide) resin A[1] _____ 10
Poly(ethylene oxide) resin B[2] _____ 8
Poly(ethylene oxide) resin C[3] _____ 1
Poly(ethylene oxide) resin D[4] _____ 1

[1] Reduced viscosity of 3.4 (approximate moleular weight of 300,000).
[2] Reduced viscosity of 5.0 (approximate molecular weight of 600,000).
[3] Reduced viscosity of 30 (approximate molecular weight of 4,000,000).
[4] Reduced viscosity of 68 (approximate molecular weight of 5,500,000).

Each of the poly(ethylene oxide) resin solutions was blended separately with the solution of Gelatin A to yield a 1:1 ratio of gelatin to poly(ethylene oxide) on a dry solids weight basis. After blending, each mixture was treated with concentrated phosphoric acid to effect a pH of 2.25. Films were cast and then were dried overnight. Control films of each of the poly(ethylene oxide) resins were also cast.

The films were examined after air-drying and were found to be compatible. Then they were conditioned, as in Example 3, and submitted to tensile testing [with the exception of the control film of poly(ethylene oxide) resin D which could not be removed from the glass without rupturing]. The tensile testing data obtained are listed below.

[1] Reduced viscosity of 3.4 (approximate molecular weight of 300,000).

| Poly(ethylene oxide) Resin | Gelatin/poly-(ethylene oxide) | Tensile, p.s.i., at Extension Rates of— | | | | Percent Elongation | Stiffness, p.s.i. |
|---|---|---|---|---|---|---|---|
| | | 50″/Minute | 10″/Minute | 5″/Minute | 0.2″/Minute | | |
| A | 0/1 | 1,477 | 1,088 | 868 | 703 | 1,000 | 35,161 |
| A | 1/1 | 1,011 | 7,566 | 7,231 | 4,673 | 40 | 202,822 |
| B | 0/1 | 1,483 | 1,433 | 1,228 | 826 | 780 | 40,338 |
| B | 1/1 | 1,322 | 2,513 | 6,613 | 5,467 | 40 | 255,732 |
| C | 0/1 | 1,386 | 1,008 | 661 | 343 | 45 | 26,470 |
| C | 1/1 | 2,028 | 1,587 | 1,039 | 441 | 120 | 4,409 |
| D | 1/1 | 2,028 | 7,671 | 3,318 | 451 | 15 | 19,026 |

The test data demonstrated that the addition of gelatin to the poly(ethylene oxide) under constant pH conditions increased the tensile strength in all cases. In a similar fashion, the elongation of Gelatin A (see Example 3) was increased in all cases by the addition of poly(ethylene oxide) resin.

Example 7

Specimens of films selected at random from those cast in Example 3 were employed to prepare a 6 percent solids solution in distilled water at room temperature. The solution required only five minutes to prepare, and there was no evidence of undissolved material. The solution was cooled to 0° C. and within fifteen minutes a strong, stiff gel was formed.

This example illustrates that blends of poly(ethylene oxide) resin and gelatin dissolve in water at temperatures much lower than those required for gelatin, yet are adapted to form strong gels when desired.

Example 8

A five percent solution of Gelatin A was prepared in warm water in the same manner as Example 1. A 10 percent solids solution of poly(alkylene oxide) resin was prepared as in the previous manner employing a poly(ethylene oxide-propylene oxide) resin [1] (80/20 ratio).

A blend was prepared of 100 grams of the Gelatin A solution and 50 grams of poly(alkylene oxide) copolymer solution. This corresponded to a 1:1 ratio of gelatin to poly(alkylene oxide) resin on a dry solids weight basis. A film was cast from this solution and set aside to air-dry. To the remainder of the solution, twenty drops of concentrated phosphoric acid were added. The acidified blend was allowed to stand approximately five minutes. Then a film was cast on glass and set aside to air-dry.

After the air-drying period, the films were examined. The unacidified film was quite hazy, weak and filled with small lumps of material which had separated from the blend. The film from the acidified blend was clear and smooth and had good strength.

Results similar to those above are obtained when the ratio of ethylene oxide to propylene oxide in the copolymer is varied, and also when poly(propylene oxide), poly(propylene oxide-butylene oxide), poly(ethylene oxide-butylene oxide) and poly(butylene oxide) are employed, either individually or as a mixture of poly(alkylene oxide) resins.

---

[1] Reduced viscosity of 5.76 (approximate molecular weight of 800,000).

---

What is claimed is:

1. A composition comprising an aqueous solution of gelatin and poly(alkylene oxide) resin having a molecular weight in the range between about twenty thousand and ten million, said composition having a pH in the acid range.

2. A composition comprising an aqueous solution of gelatin and poly(alkylene oxide) resin having a molecular weight in the range between about twenty thousand and ten million, said poly(alkylene oxide) resin and gelatin being present in a ratio between about 0.1 and 10 parts by weight of poly(alkylene oxide) resin per part of gelatin, and wherein said composition has a pH in the acid range.

3. A composition comprising an aqueous solution of gelatin and poly(alkylene oxide) resin having a molecular weight in the range between about twenty thousand and ten million, said poly(alkylene oxide) resin and gelatin being present in a ratio between about 0.1 and 10 parts by weight of poly(alkylene oxide) resin per part of gelatin, and wherein the pH of said composition is in the range between about 2 and 6.

4. A composition comprising an aqueous solution of gelatin and poly(ethylene oxide) resin having a molecular weight in the range between about twenty thousand and ten million, said composition having a pH in the acid range.

5. A composition comprising an aqueous solution of gelatin and poly(ethylene oxide-propylene oxide) resin having a molecular weight in the range between about twenty thousand and ten million, said composition having a pH in the acid range.

6. The composition of claim 1 in the form of a gel.

7. The composition of claim 1 coated on a substrate.

8. A pulverulent composition comprising the solids content of the composition of claim 1.

References Cited in the file of this patent

UNITED STATES PATENTS 2,423,549    Blake et al.    July 8, 1947
2,872,427    Schroeder    Feb. 3, 1959